US012695225B2

(12) United States Patent
Dunfee et al.

(10) Patent No.: US 12,695,225 B2
(45) Date of Patent: Jul. 28, 2026

(54) MEMORY MODULE GUIDANCE AND RETENTION STRUCTURE

(71) Applicant: INTERNATIONAL BUSINESS MACHINES CORPORATION, Armonk, NY (US)

(72) Inventors: Nathan Lee Dunfee, Rochester, MN (US); Kevin O'Connell, Mantorville, MN (US); Christopher M. Marroquin, Rochester, MN (US); Stephen P. Mroz, Rochester, MN (US); Mark David Pfeifer, Owatonna, MN (US); Kenneth E. Lubahn, Oronoco, MN (US); Justin Christopher Rogers, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 17/946,146

(22) Filed: Sep. 16, 2022

(65) Prior Publication Data

US 2024/0097365 A1 Mar. 21, 2024

(51) Int. Cl.
*H01R 12/72* (2011.01)

(52) U.S. Cl.
CPC ......... *H01R 12/721* (2013.01); *H01R 12/727* (2013.01)

(58) Field of Classification Search
CPC .... H01R 12/721; H01R 12/727; H01R 12/00; H01R 12/51
USPC .............................................. 439/71, 61, 377
See application file for complete search history.

(56) References Cited

U.S. PATENT DOCUMENTS

| | | | | | |
|---|---|---|---|---|---|
| 4,124,878 | A * | 11/1978 | Ebner | H05K 7/1424 | 361/756 |
| 4,151,580 | A * | 4/1979 | Struger | H05K 7/1469 | 361/755 |
| 5,214,572 | A * | 5/1993 | Cosimano | G06F 1/186 | 439/62 |
| 5,445,531 | A | 8/1995 | Billman et al. | | |
| 5,559,672 | A * | 9/1996 | Buras, Jr. | G06F 1/1616 | 439/138 |
| 5,757,618 | A * | 5/1998 | Lee | G06F 1/185 | 361/740 |
| 6,056,574 | A | 5/2000 | Yeomans et al. | | |
| 6,498,731 | B1 * | 12/2002 | Roscoe | H05K 7/1431 | 361/801 |

(Continued)

FOREIGN PATENT DOCUMENTS

WO 2014116214 A1 7/2014

OTHER PUBLICATIONS

Molex, DDR4 DIMM Sockets, Haolgen-free, URL: https://www.farnell.com/datasheets/1801294.pdf, 2014, retrieved Jun. 24, 2022, 6 pages.

*Primary Examiner* — Gary F Paumen
(74) *Attorney, Agent, or Firm* — Onyx IP Group

(57) ABSTRACT

An apparatus for guidance and retention of integrated circuit boards includes a first structure configured to receive a first integrated circuit board and guide the first integrated circuit board for coupling to a substrate. The apparatus further includes a second structure configured to be removably coupled to the first structure. The second structure includes a first spring member configured to apply a first compressive force to the first integrated circuit board.

20 Claims, 15 Drawing Sheets

(56) References Cited

U.S. PATENT DOCUMENTS

| | | | |
|---|---|---|---|
| 7,252,523 | B1 | 8/2007 | Pennypacker et al. |
| 7,277,296 | B2 | 10/2007 | Ice |
| 7,396,244 | B1 | 7/2008 | Barna et al. |
| 7,438,569 | B2 | 10/2008 | Pennypacker et al. |
| 8,636,528 | B2 | 1/2014 | Sass et al. |
| 9,872,406 | B2 | 1/2018 | Boetzer |

* cited by examiner

MEMORY MODULE GUIDANCE AND RETENTION STRUCTURE

BACKGROUND

Field of the Disclosure

The present disclosure relates in general to computing systems, and more particularly, to various embodiments of structures for guidance and retention of memory modules within computing systems.

Description of Related Art

Computing systems typically utilize random access memory (RAM) to temporarily store information used during computing processes. This memory is often embodied as a memory module which includes memory circuitry mounted to an integrated circuit board. The memory module typically includes an edge connector that is coupled to a motherboard or other substrate via a connector such as a slot connection. One common form factor for memory modules is a dual in-line memory module (DIMM). As computing requirements increase, a need exists for more compact memory module form factors. A next generation memory module form factor is that of a differential DIMM (DDIMM) card. DDIMM cards are relatively small and have a very small contact pitch when compared to traditional DIMMs and are available in different form factors.

A solution for guidance during insertion and retention after insertion of DDIMMs is needed to prevent DDIMM connector damage and wear. Industry standard connectors for previous generation DIMMs include latches built into the connector to provide retention. However, the industry standard connector for DDIMMS is much smaller and does not have these latch features. Designing additional parts to implement a similar solution as was used for DIMMs is not feasible due to component density in the computing system enclosure, lack of board space, and requirements of user hand access for insertion of the DDIMMS. Previous solutions for DIMM modules have sometimes utilized "top-hat" components that are added to the top of lower profile DIMM form factors to make them the same height as taller form factors. However, high density, lack of board space, and accessibility requirements have made utilizing such "top-hat" components as not a viable solution to computing systems utilizing, for example, a smaller chassis with limited space. In addition, these solutions often come with a higher cost than desired for the target market. Further, previous generation DIMMs often utilized tools to aid in insertion and removal of the DIMMs. Concerns related to where and how to store the insertion and removal tool as well as the possibility of a user losing or misplacing the tool have made the requirement of using such tools to be less desirable. As a result, an improved solution for guidance and retention of integrated circuit boards, such as DDIMM modules, is desired.

SUMMARY

Apparatus and systems for guidance and retention of integrated circuit boards, such as memory modules, according to various embodiments are disclosed in this specification. An apparatus includes a first structure configured to receive a first integrated circuit board and guide the first integrated circuit board for coupling to a substrate, such as a mainboard. The apparatus includes a second structure configured to be removably coupled to the first structure. The second structure includes a first spring member configured to apply a first compressive force to the first integrated circuit board.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
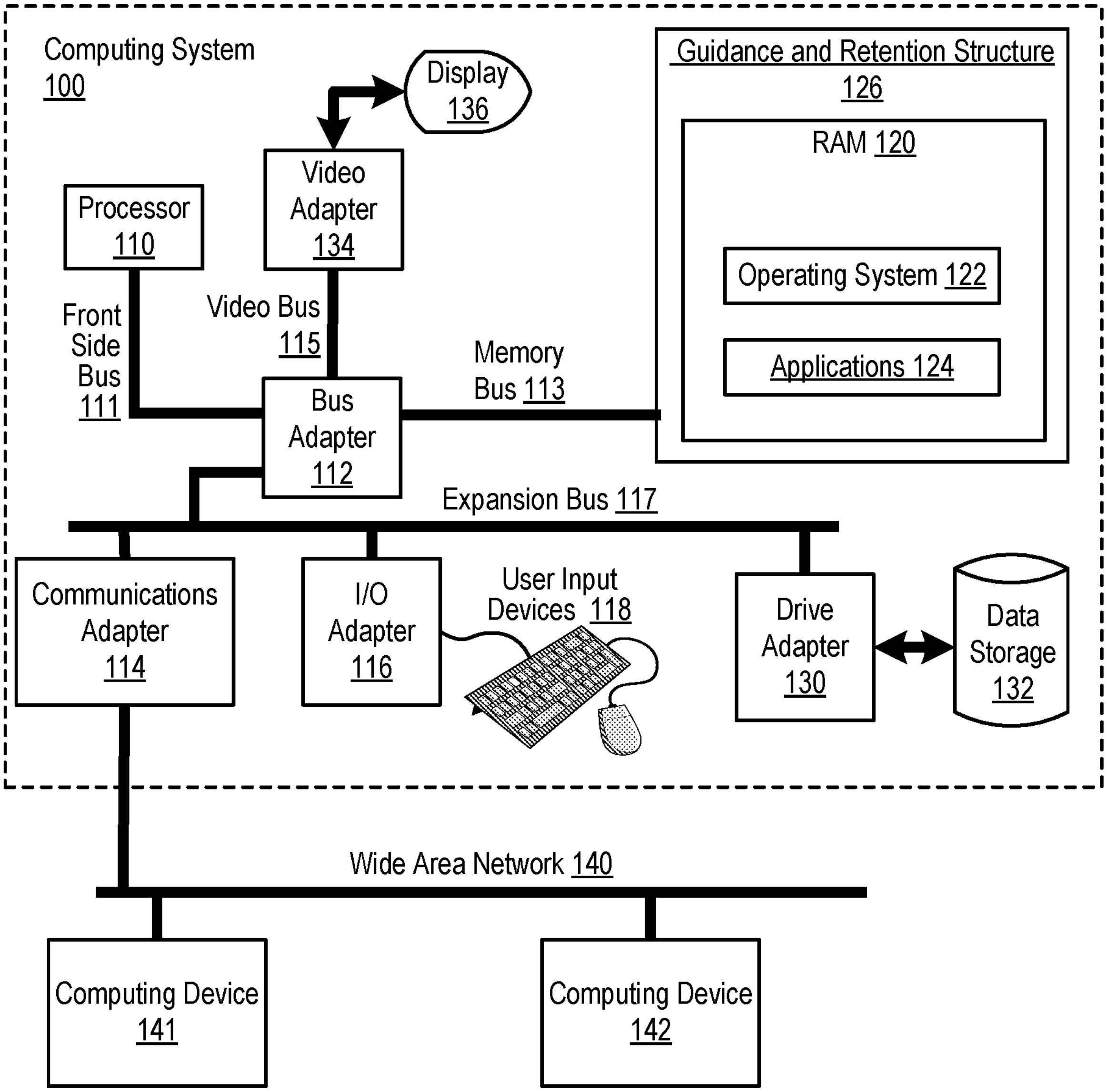
FIG. 1 a block diagram of an example computing system configured with structures for guidance and retention of memory modules within the computing system in accordance with embodiments of the present disclosure.

Exemplary apparatus and systems including structures for guidance and retention of memory modules within computing systems in accordance with the present disclosure are described with reference to the accompanying drawings, beginning with FIG. 1. FIG. 1 sets forth a block diagram of an example computing system 100 configured with structures for guidance and retention of memory modules within the computing system in accordance with embodiments of the present disclosure. The computing system 100 of FIG. 1 includes at least one computer processor 110 or 'CPU' as well as random access memory (RAM') 120 which is connected through a high speed memory bus 113 and bus adapter 112 to processor 110 and to other components of the computing system 100.

Stored in RAM 120 is an operating system 122. Operating systems useful in computers configured for presenting content history to a user added to a group chat according to embodiments of the present disclosure include UNIX™, Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. Also stored in RAM are applications 124 executable by the processor 110 for performing various operations of the computing system 100.

The computing system 100 further includes a guidance and retention structure 126 configured for guiding and retaining one or more memory modules of RAM 120 according to embodiments of the present disclosure. In various embodiments, the guidance and retention structure 126 is mounted to a substrate, such as a motherboard or mainboard, of the computing system 100 and guides the one or more memory modules during insertion into corresponding connectors or sockets of the substrate. In various embodiments, the guidance and retention structure 126 further retains the one or more memory modules in the installed position. In some embodiments, the memory modules include DIMMs or DDIMMs. In other embodiments, the guidance and retention structure 126 is configured to guide and retain other integrated circuit boards instead of or in addition to memory modules.

The computing system 100 of FIG. 1 includes disk drive adapter 130 coupled through expansion bus 117 and bus adapter 112 to processor 110 and other components of the computing system 100. Disk drive adapter 130 connects non-volatile data storage to the computing system 100 in the form of data storage 132. Disk drive adapters useful in computers configured for inserting sequence numbers into editable tables according to embodiments of the present disclosure include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 802.3) adapters for wired data communications, and 802.11 adapters for wireless data communications. The communications adapter 114 of FIG. 1 is communicatively coupled to a wide area network 140 that also includes other computing devices, such as computing devices 141 and 142 as shown in FIG. 1. In one or more embodiments, the computing system 100 is a server and computing devices 141 and 142 are client devices.

Embodiments of the guidance and retention structure 126 includes a guide portion that is configured to be mounted to a board and includes slots to provide alignment during installation of memory modules, e.g., DDIMMs, into the board, and a strap or cap portion that is snapped onto the top of guide portion after the memory modules are installed. In particular embodiments, the guide portion of the guidance and retention structure 126 is mounted to the substrate using clinch nuts soldered to a bottom side of the substrate or other suitable fasteners. In various embodiments, the strap portion includes spring members that are configured to engage a top edge of the memory modules and apply a force to the memory modules to provide retention, compliance, and/or preload to the memory modules to prevent connector wear. In particular embodiments, the spring members include spring fingers having a curved profile that include integrated features to prevent over-deflection of the fingers during installation of the strap portion. In particular embodiments, each of the spring fingers are shaped to provide the same amount of force to a corresponding memory module, based on the deflection of the strap portion and the difference in interference between the tapered spring and the memory modules.

During an exemplary operation of the guidance and retention structure 126, memory modules are inserted into guidance slots in the guide portion to couple with connectors of the substrate, and the strap or cap portion is installed top-down on the guide portion by downward pressure. As the strap or cap portion is pressed downward, latch/catch features on the guide portion flex and snap into place within engagement slots of the strap portion to hold the memory modules in contact with the spring members. The snapping of the latch features of the guide portion into the engagement slots of the strap portion provide a tactile feedback to a user to ensure that the strap portion is completely attached. To remove the strap portion, the user may use a thumb and forefinger to squeeze the latch/catch features on the guide portion to cause the latch/catch features to flex towards the middle of the guide portion. The preload of the spring members of the strap portion against the memory modules causes the strap to pop upwards. At this point, the strap portion is loose and can be easily lifted away so that the memory modules can be removed. Accordingly, one-handed tool-less installation and removal of memory modules is provided.

In accordance with various embodiments, the guide portion and/or strap portion is modified to accommodate different memory module form factors such as to accommodate different height DDIMMs. In addition, the guide portion and/or strap portion may be modified to allow banks of multiple memory modules to be guide and retained. In particular embodiments, the height of the guide portion is sized to accommodate smaller and larger DDIMMs. For systems supporting only a single DDIMM form factor, it may be most economical to choose a guide portion and low-profile strap portion to accommodate the particular form factor. However, for systems which need to support multiple DIMM form factors, it may be more economical, for example, to choose a shorter guide and apply different-height strap portions to accommodate taller DIDIMM profiles. For systems using banks of multiple DDIMMs, a wider strap portion may be used having varying profiles of the spring members. Due to the extra width of these portions, it is possible for the strap portion to flex across the banks of DDIMMs when installed. Accordingly, in an embodiment the outermost spring members are given a tapered profile to provide a consistent preload force across the DDIMMs when installed. In particular embodiments, the spring finger length, thickness and interference amount of the spring members are modified to provide a desired force. In one or more embodiments, integrated stop features are provided in the strap portion to avoid over-deflecting of the spring members.

In various embodiments, an apparatus for guidance and retention of integrated circuit boards includes a first structure configured to receive a first integrated circuit board and guide the first integrated circuit board for coupling to a substrate, and a second structure configured to be removably coupled to the first structure. The second structure includes a first spring member configured to apply a first compressive force to the first integrated circuit board.

In various embodiments, the second structure is further configured to receive a second integrated circuit board, and wherein the second structure further includes a second spring member configured to apply a second compressive force to the second integrated circuit board. In various embodiments, the first compressive force is the same as the second compressive force. In other embodiments, the first compressive force is different than the second compressive force.

In various embodiments, the first structure further includes at least one slot for guiding the first integrated circuit board for coupling to the substrate. In various embodiments, the first structure is further configured to be coupled to the substrate. In various embodiments, the first structure includes a guide portion configured to house the first integrated circuit board. In various embodiments, the second structure includes a cap portion configured to cover a portion of the guide portion.

In various embodiments, the first structure includes an engagement portion configured to engage the second structure. In various embodiments, the engagement portion comprises at least one engagement tab configured to engage an engagement slot of the second structure.

In various embodiments, a method for guidance and retention of integrated circuit boards includes providing a first structure configured to receive a first integrated circuit board and guide the first integrated circuit board for coupling to a substrate, and providing a second structure configured to be removably coupled to the first structure. The second structure includes a first spring member configured to apply a first compressive force to the first integrated circuit board.

In various embodiments, the method further includes coupling the first structure to the substrate. In various embodiments, the method further includes inserting the first integrated circuit board into the first structure, and coupling the second structure to the first structure.

Various embodiments provide for a low-cost, tool-less structure for guidance and retention of memory modules having a limited board footprint and limited board holes for mounting to minimally disrupt wiring. Various embodiments further provide for a structure for guidance and retention of memory modules allowing for air flow to provide cooling of memory modules while providing for structural robustness against shock and vibration. Various embodiments provide for guidance, retention, and compliance of installed memory modules as well as easy user access. Various embodiments of the structure for guidance and retention of memory modules provide for retaining visibility of LED light pipes and labels for DDIMM identification.

Figure 2:
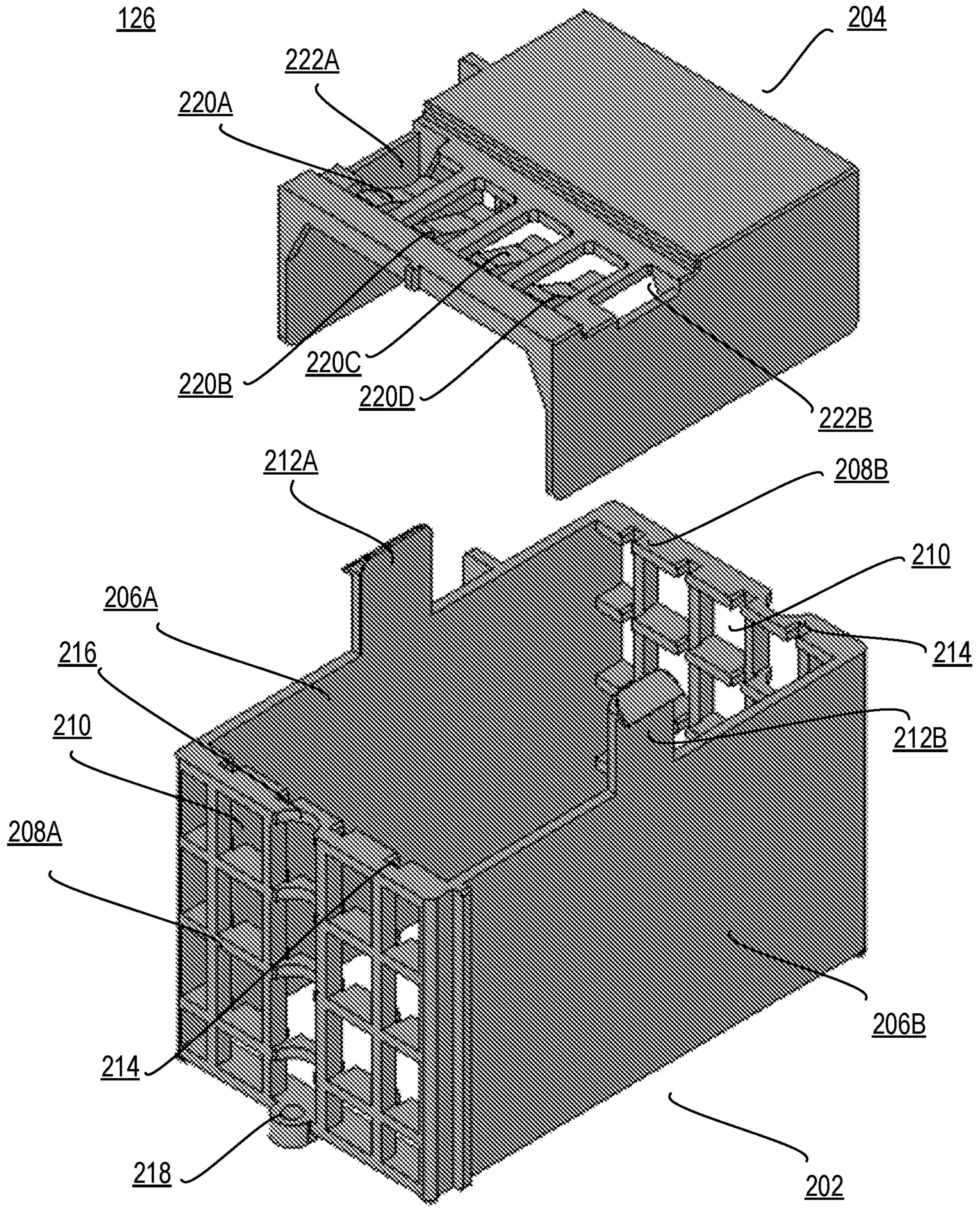
FIG. 2 shows a front perspective view of a guidance and retention structure for guidance and retention of memory modules according to embodiments of the present disclosure.

For further explanation, FIG. 2 shows a front perspective view of a guidance and retention structure 126 for guidance and retention of memory modules according to embodiments of the present disclosure. The guidance and retention structure 126 includes a guide portion 202 and a cap portion 204. In particular embodiments, the guide portion 202 and the cap portion 204 are constructed of one or more of a plastic material, a metal material, or any other suitable material. The guide portion 202 includes a first sidewall 206A, a second sidewall 206B, a front wall 208A, and a rear wall 208B arranged in a box configuration with an open-ended top and bottom. In the embodiment illustrated in FIG. 2, the first sidewall 206A and the second sidewall 206B are solid and function to prevent rotation during installation/removal of memory modules, and the front wall 208A and the second wall 208B include a number of vent holes 210 to allow a flow of air to be provided to installed memory modules. In particular embodiments, the guide portion 202 interfaces with an air baffle to provide a fresh airflow to one or more banks of adjacent memory modules. The first sidewall 206A includes a first engagement tab 212A, and the second sidewall 206B includes a second engagement tab 212B. The front wall 208A and the rear wall 208B each include four slots 214 configured to guide four memory modules when inserted into the guide portion 202. The slots 214 prevent tilting of the memory module as well as contacting adjacent memory modules during installation. The front wall 208A and the rear wall 208B each include a channel 216 and a mounting hole 218 to facilitate mounting of the guide portion 202 to a substrate.

The cap portion 204 includes a four spring fingers 220A, 220B, 220C, 220D each configured to contact and provide a compressive force on a corresponding memory module when the cap portion 204 is engaged with the guide portion 202. Although various embodiments are illustrated as using spring fingers as spring members, in other embodiments other suitable spring members are used such a leaf spring or coil springs. The cap portion 204 further includes a first engagement slot 222A and a second engagement slot 222B configured to receive the first engagement tab 212A and the second engagement tab 212B, respectively, upon engagement of the cap portion 204 with the guide portion 202.

Figure 3:
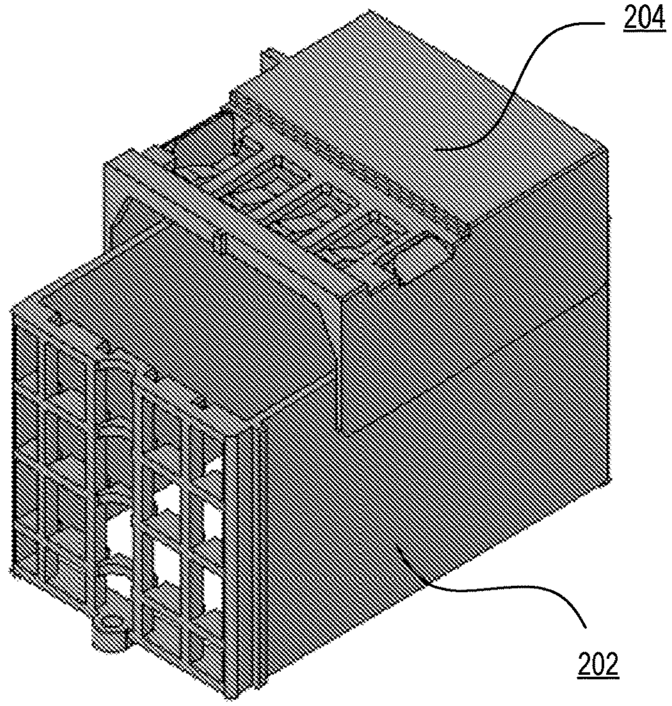
FIG. 3 shows a front perspective view of the guidance and retention structure of FIG. 2 in an engaged configuration according to embodiments of the present disclosure.

For further explanation, FIG. 3 shows a front perspective view of the guidance and retention structure 126 of FIG. 2 in an engaged configuration according to embodiments of the present disclosure. As shown in FIG. 3 the guide portion 202 is fully engaged with the cap portion 204 such that the first engagement tab 212A and the second engagement tab 212B of the guide portion 202 are engaged with the first engagement slot 222A and the second engagement slot 222B of the cap portion 204.

Figure 4:
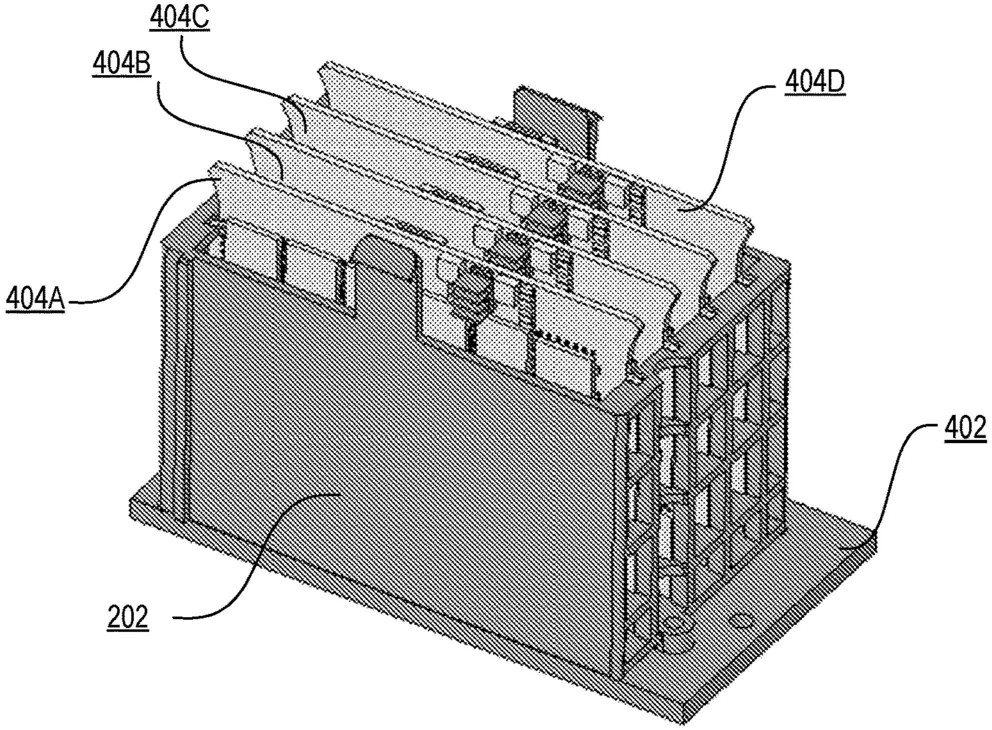
FIG. 4 shows a front perspective view of memory modules installed in the guide portion of the guidance and retention structure of FIG. 2 according to embodiments of the present disclosure.

For further explanation, FIG. 4 shows a front perspective view of memory modules installed in the guide portion 202 of the guidance and retention structure 126 of FIG. 2 according to embodiments of the present disclosure. As shown in FIG. 4, the guide portion 202 is mounted to a substrate 402 such as a mainboard. The guide portion 202 further includes four DDIMMs 404A, 404B, 404C, 404D installed within the slots of the guide portion 202. As shown in FIG. 4, the top edges of DDIMMs 404A-404D remain accessible to allow a thumb and forefinger of a user to grasp a particular DDIMMs for removal.

Figure 5:
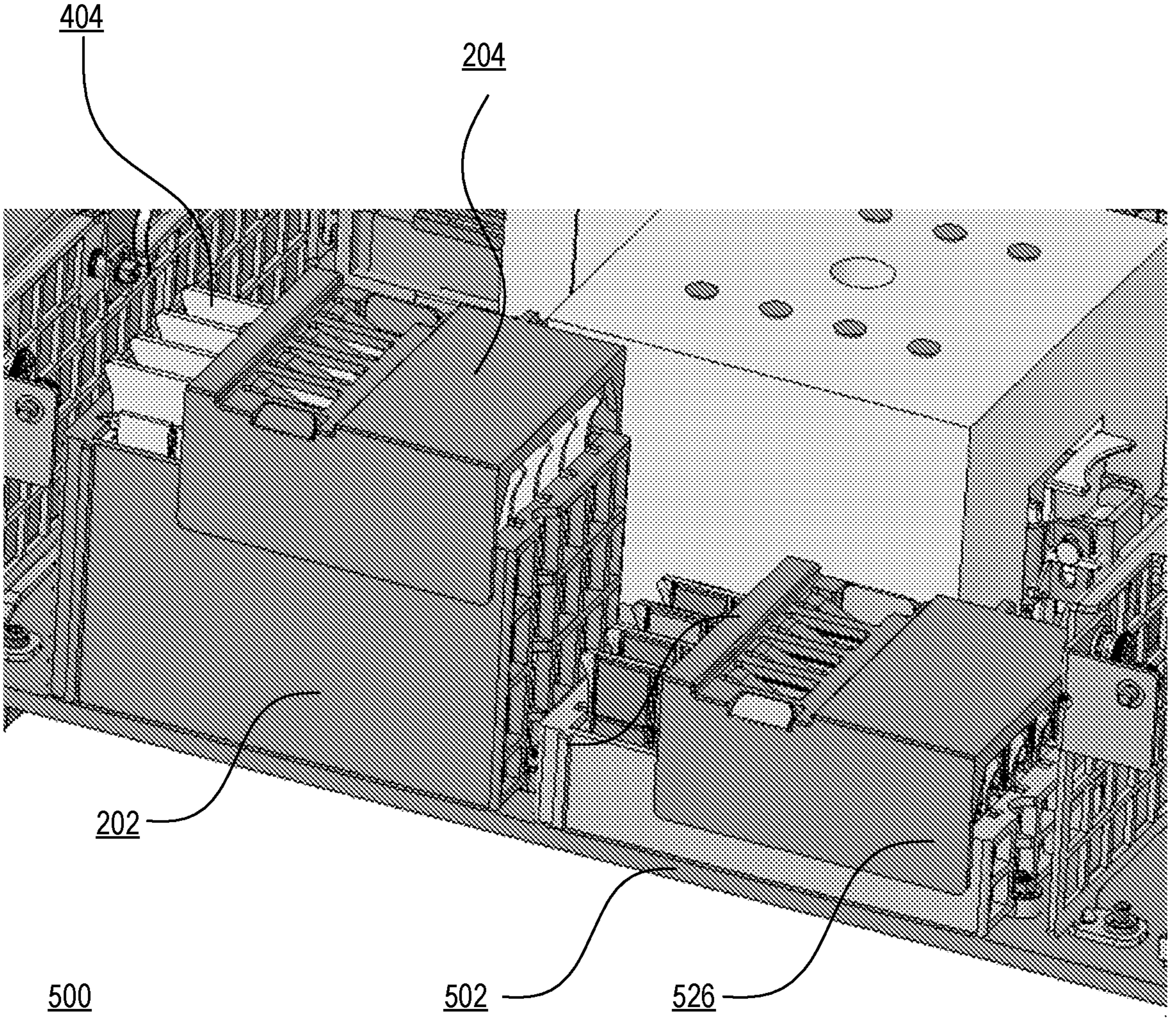
FIG. 5 shows the guidance and retention structure of FIG. 2 mounted within a chassis of a computing system according to embodiments of the present disclosure.

For further explanation, FIG. 5 shows the guidance and retention structure 126 of FIG. 2 mounted within a chassis of a computing system 500 according to embodiments of the present disclosure. The guide portion 202 is mounted to a mainboard 502 of the computing system 500. The guide portion 202 includes four DDIMMs 404 installed therein in contact with connectors of the mainboard 502. The cap portion 204 is engaged with the guide portion 202 and the finger springs of the cap portion 204 are in contact with and apply a compressive force to the corresponding DDIMMs 404. During an example engagement operation of the cap portion 204 with the guide portion 202, a user presses the cap portion 204 down onto the guide portion 202, and the engagement tabs of the guide portion 202 flex inward and then snap back to latch into the engagement slots of the cap portion 204. During an example disengagement of the cap portion 204 from the guide portion 202, the user uses a thumb and forefinger to squeeze the engagement tabs of the guide portion 204, and the preload from the spring fingers pressing on the top of the memory modules "ejects" the cap portion so that it is loose and can be lifted away. In the embodiment illustrated in FIG. 5, the guidance and retention structure 126 is of a certain height form factor. In the embodiment of FIG. 5, a second guidance and retention structure 526 housing additional DDIMMs. The second guidance and retention structure 526 is similar to the guidance and retention structure 126 except that the guide portion is shorter in height.

Figure 6:
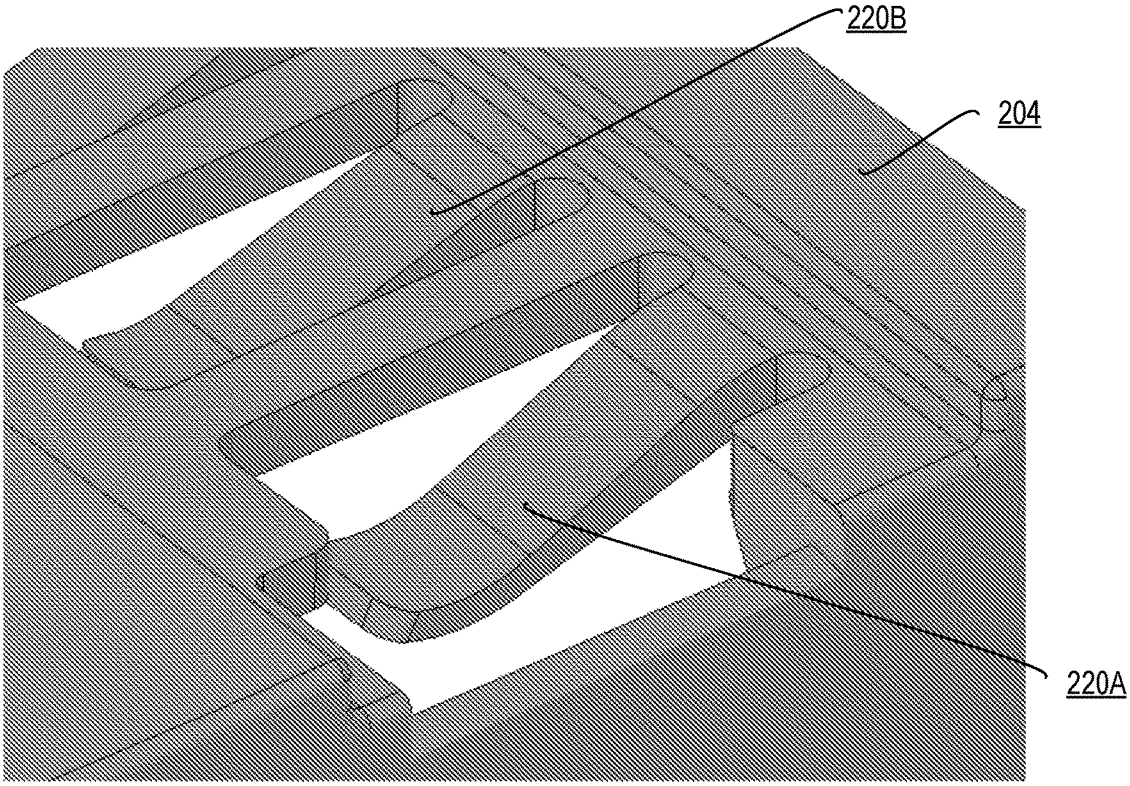
FIG. 6 shows a perspective view of spring fingers of the cap portion of the guidance and retention structure of FIG. 2 according to embodiments of the present disclosure.

For further explanation, FIG. 6 shows a perspective view of spring fingers of the cap portion 204 of the guidance and retention structure 126 of FIG. 2 according to embodiments of the present disclosure. As shown in FIG. 6, the first spring finger 220A and the second spring finger 220B of the cap portion 204 each have a downward sloping curved shape to form a spring member that is configured to apply a compressive force to a memory module when the cap portion 204 is engaged with the guide portion 202. In particular embodiments, the first spring finger 220A and the second spring finger 220B have a different profile from one another in order to configure the compressive force provided by each to a desired level. In a particular embodiment, the first spring finger 220A and the second spring finger 220B have a different profile from one another to configure the compressive force provided by each to the corresponding memory module to be the same by accounting for the flexing of the overall structure.

Figure 7:
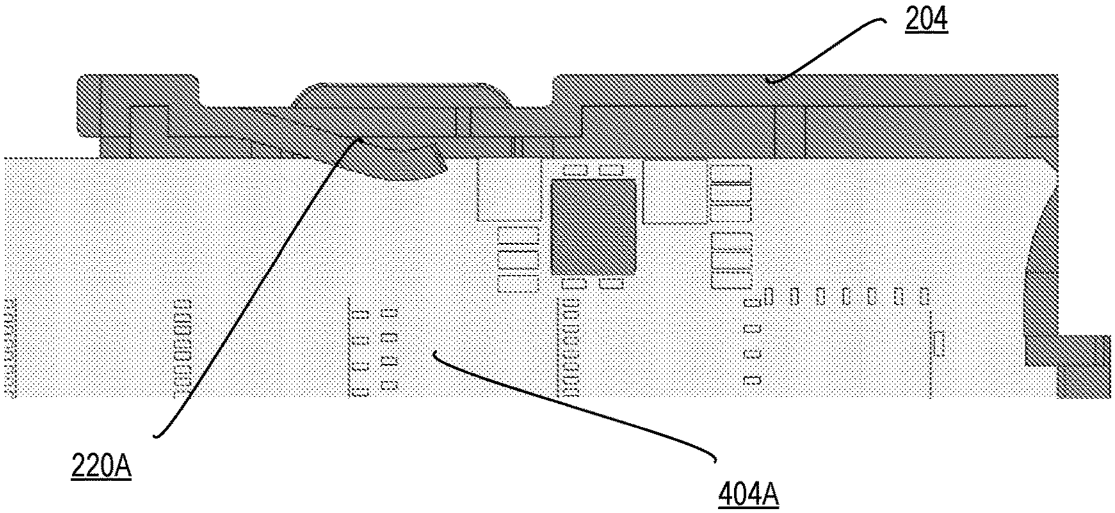
FIG. 7 shows a profile view of spring fingers of the cap portion 204 of the guidance and retention structure 126 of FIG. 2 according to embodiments of the present disclosure.

For further explanation, FIG. 7 shows a profile view of spring fingers of the cap portion 204 of the guidance and retention structure 126 of FIG. 2 according to embodiments of the present disclosure. As shown in FIG. 7, the first spring finger 220A is in contact with a first DDIMM 404A.

Figure 8A:
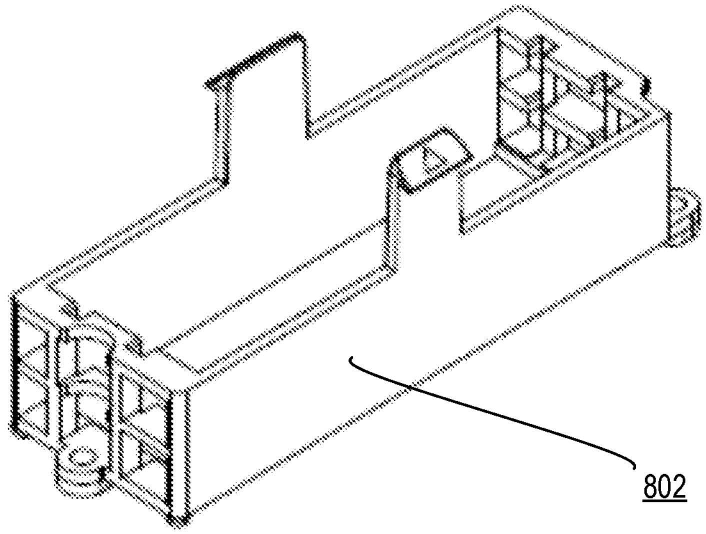
FIGS. 8A-8B show a perspective views of a guide portion of a guidance and retention structure for guidance and retention of memory modules according to other embodiments of the present disclosure.
Figure 8B:
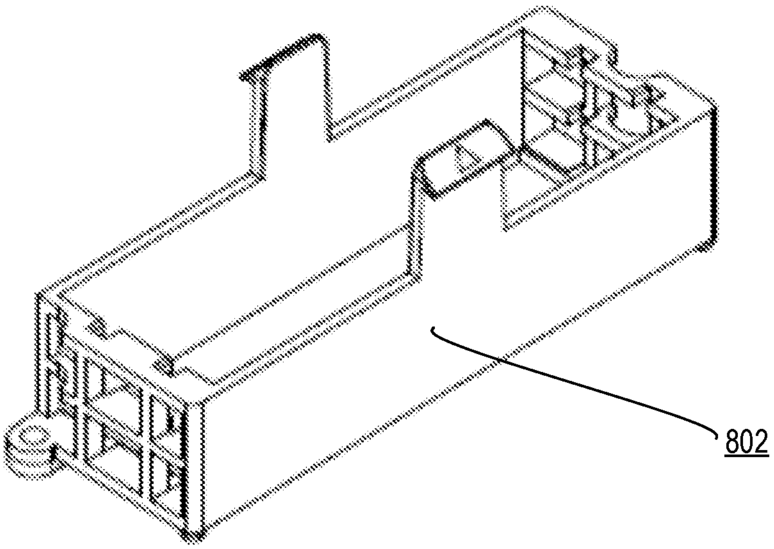

FIGS. 8A-8B show perspective views of a guide portion 802 of a guidance and retention structure for guidance and retention of memory modules according to other embodiments of the present disclosure. FIG. 8A shows a front perspective view of the guide portion 802, and FIG. 8B shows a rear perspective view of the guide portion 802. The guide portion 802 is similar to the guide portion 202 of the guidance and retention structure 126 of FIG. 2 except that the guide portion 802 is of a relatively short height and includes slots to allow insertion of two memory modules.

Figure 9A:
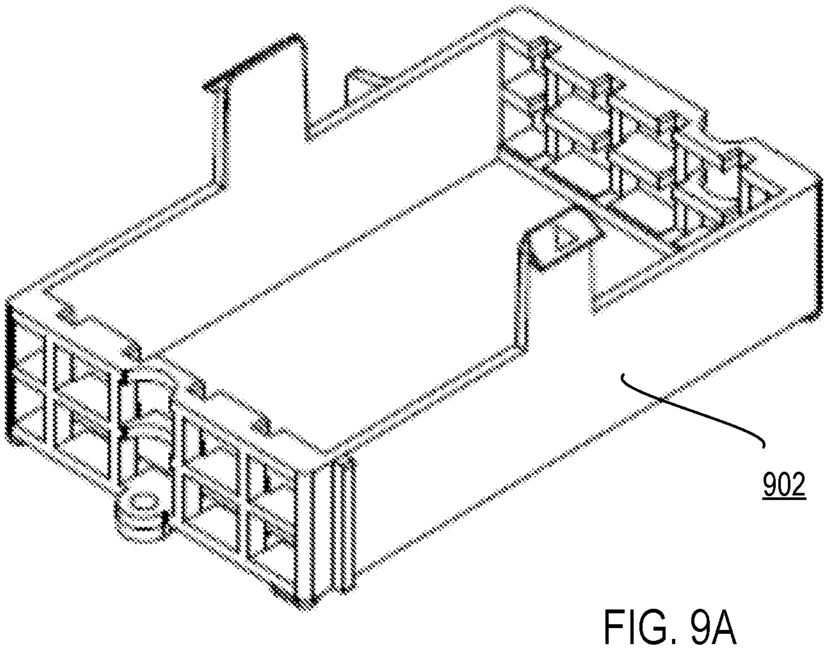
FIGS. 9A-9B show perspective views of a guide portion of a guidance and retention structure for guidance and retention of memory modules according to other embodiments of the present disclosure.
Figure 9B:
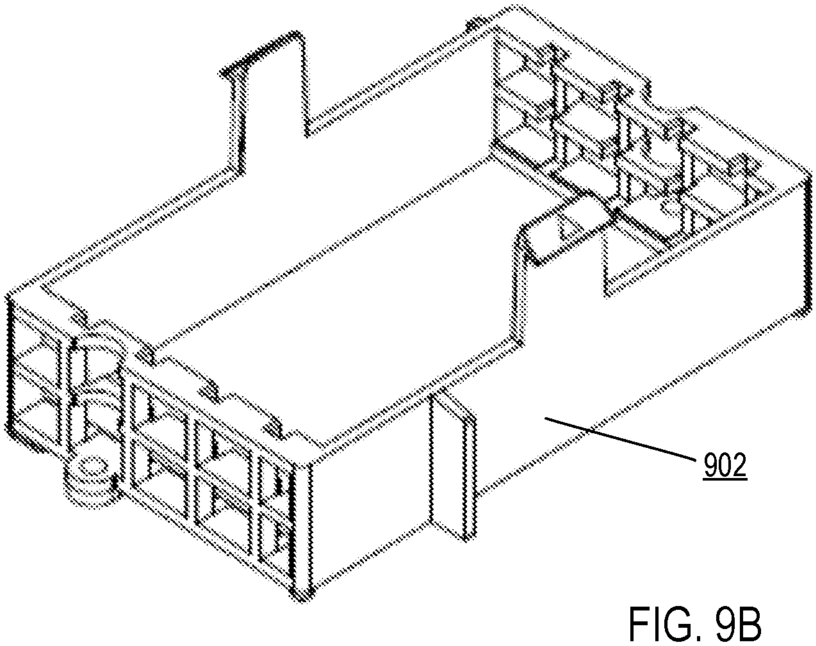

FIGS. 9A-9B show perspective views of a guide portion 902 of a guidance and retention structure for guidance and retention of memory modules according to other embodiments of the present disclosure. FIG. 9A shows a front perspective view of the guide portion 902, and FIG. 9B shows a rear perspective view of the guide portion 902. The guide portion 902 is similar to the guide portion 202 of the guidance and retention structure 126 of FIG. 2 except that the guide portion 902 is of a relative short height and includes slots to allow insertion of four memory modules.

Figure 10A:
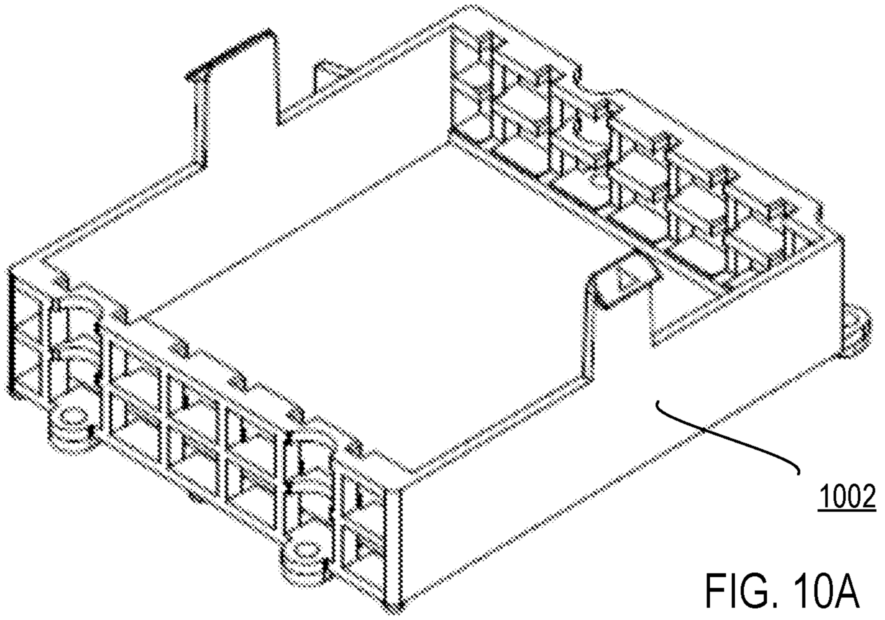
FIGS. 10A-10B show perspective views of a guide portion of a guidance and retention structure for guidance and retention of memory modules according to other embodiments of the present disclosure.
Figure 10B:
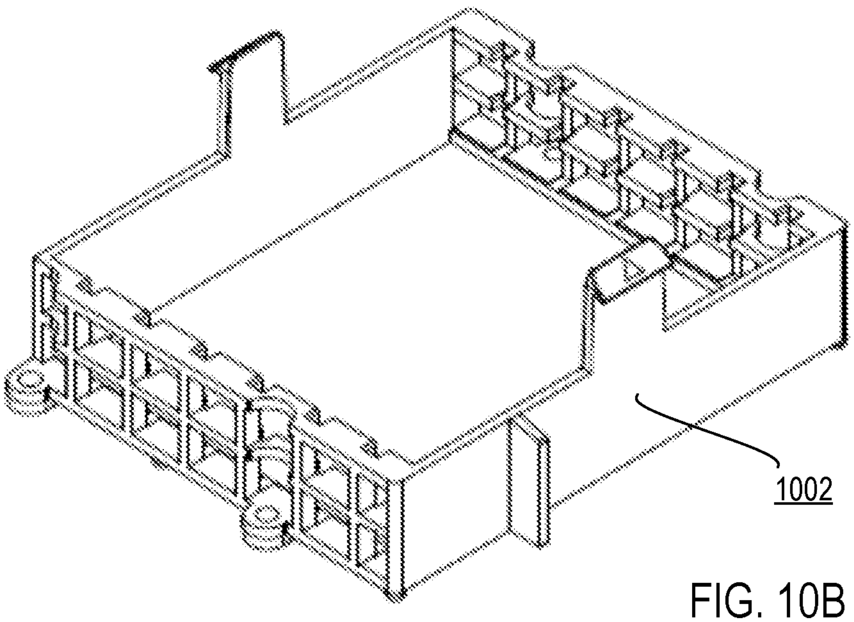

FIGS. 10A-10B show perspective views of a guide portion 1002 of a guidance and retention structure for guidance and retention of memory modules according to other embodiments of the present disclosure. FIG. 10A shows a front perspective view of the guide portion 1002, and FIG. 10B shows a rear perspective view of the guide portion 1002. The guide portion 1002 is similar to the guide portion 202 of the guidance and retention structure 126 of FIG. 2 except that the guide portion 1002 is of a relatively short height and includes slots to allow insertion of six memory modules.

Figure 11A:
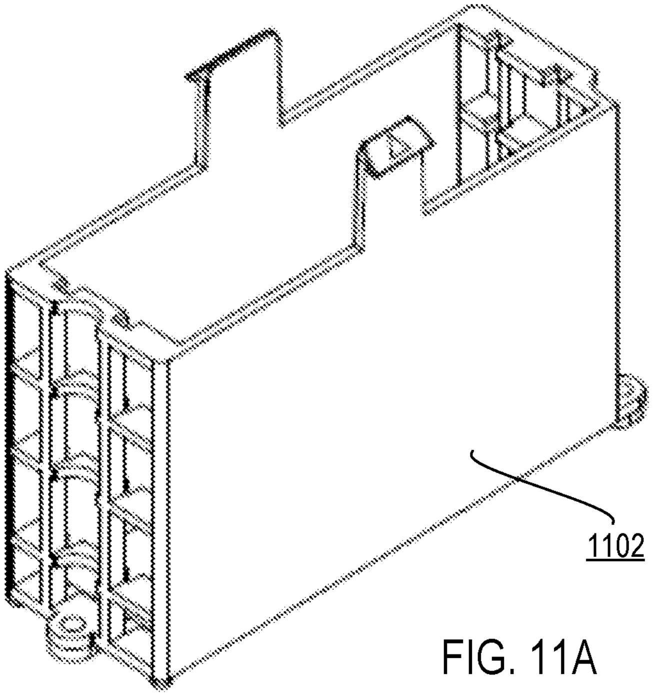
FIGS. 11A-11B show perspective views of a guide portion of a guidance and retention structure for guidance and retention of memory modules according to other embodiments of the present disclosure.
Figure 11B:
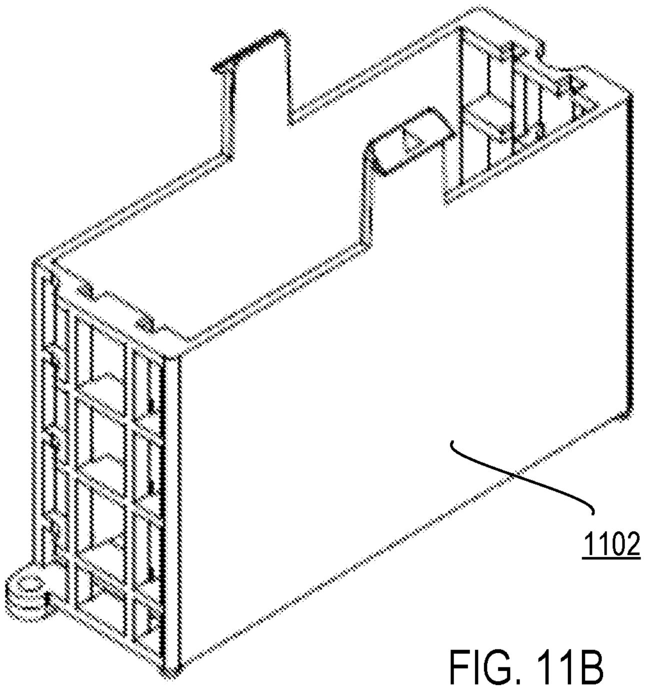

FIGS. 11A-11B show perspective views of a guide portion 1102 of a guidance and retention structure for guidance and retention of memory modules according to other embodiments of the present disclosure. FIG. 11A shows a front perspective view of the guide portion 1102, and FIG. 11B shows a rear perspective view of the guide portion 1102. The guide portion 1102 is similar to the guide portion 202 of the guidance and retention structure 126 of FIG. 2 except that the guide portion 1102 is of a relatively moderate height and includes slots to allow insertion of two memory modules.

Figure 12A:
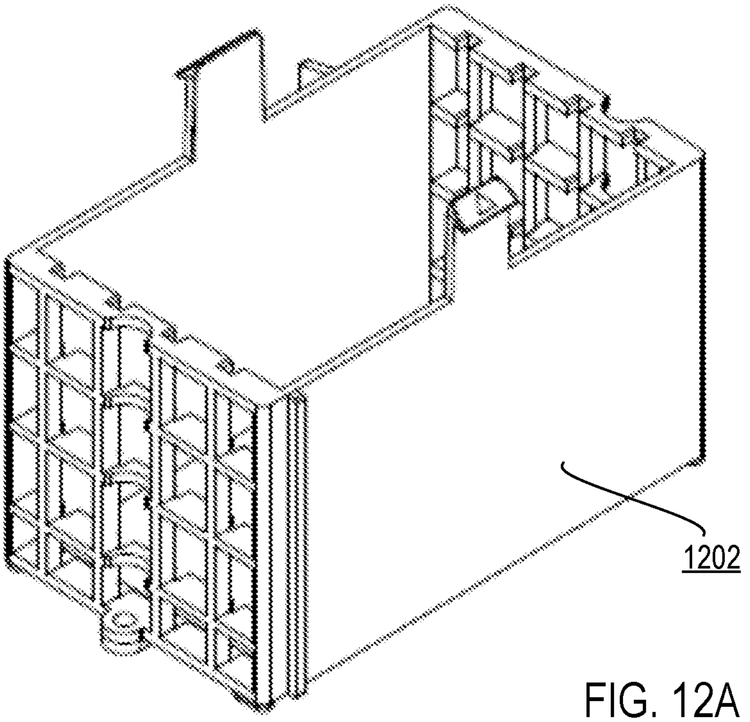
FIGS. 12A-12B show perspective views of a guide portion of a guidance and retention structure for guidance and retention of memory modules according to other embodiments of the present disclosure.
Figure 12B:
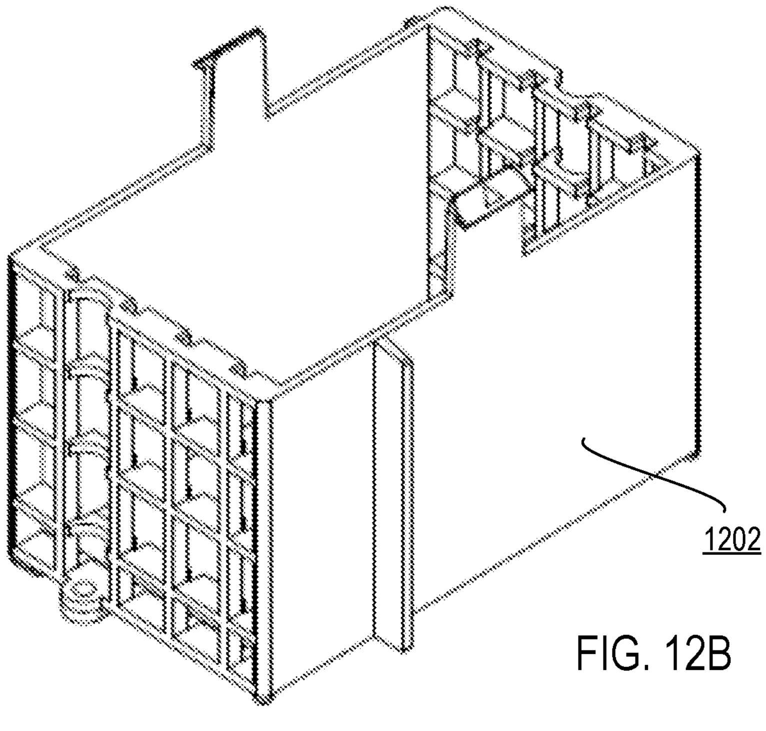

FIGS. 12A-12B show perspective views of a guide portion 1202 of a guidance and retention structure for guidance and retention of memory modules according to other embodiments of the present disclosure. FIG. 12A shows a front perspective view of the guide portion 1202, and FIG. 12B shows a rear perspective view of the guide portion 1202. The guide portion 1202 is similar to the guide portion 202 of the guidance and retention structure 126 of FIG. 2 and is of a relatively moderate height and includes slots to allow insertion of four memory modules.

Figure 13A:
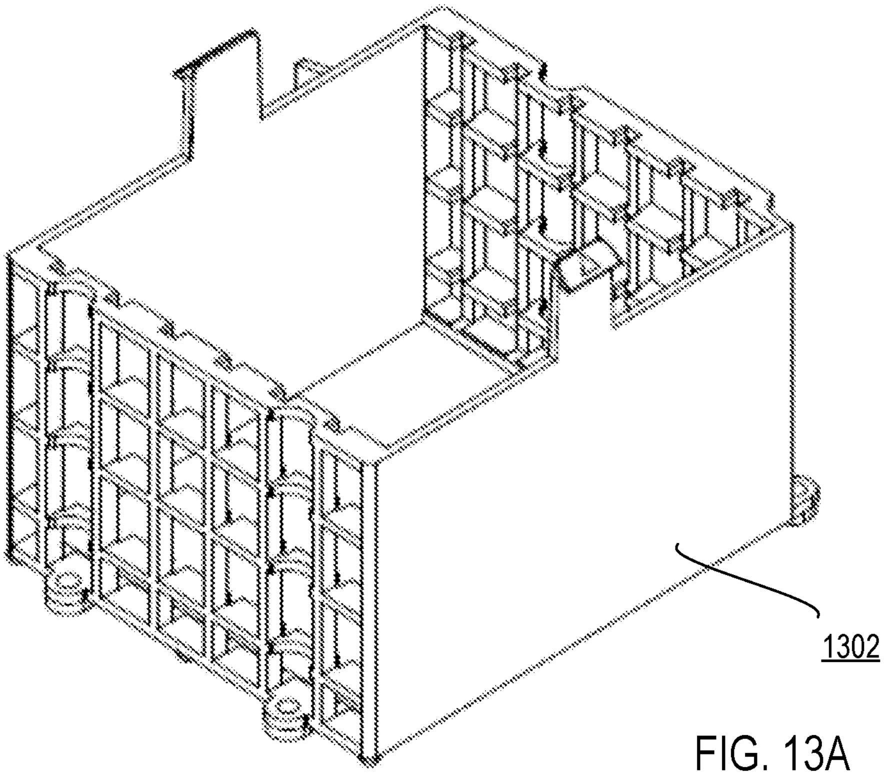
FIGS. 13A-13B show perspective views of a guide portion of a guidance and retention structure for guidance and retention of memory modules according to other embodiments of the present disclosure.
Figure 13B:
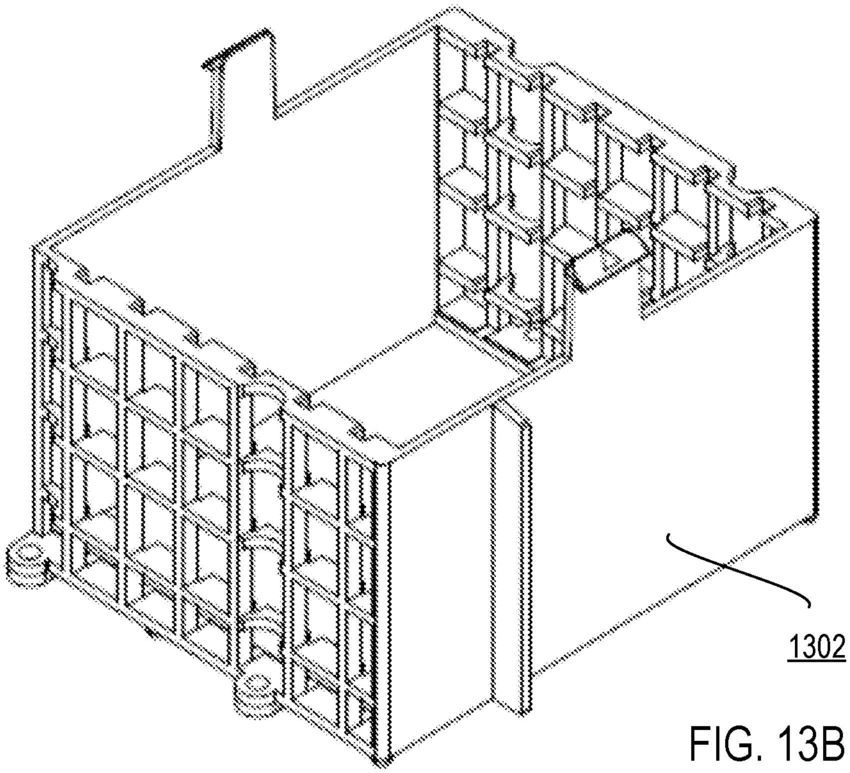

FIGS. 13A-13B show perspective views of a guide portion 1302 of a guidance and retention structure for guidance and retention of memory modules according to other embodiments of the present disclosure. FIG. 13A shows a front perspective view of the guide portion 1302, and FIG. 13B shows a rear perspective view of the guide portion 1302. The guide portion 1302 is similar to the guide portion 202 of the guidance and retention structure 126 of FIG. 2 except that the guide portion 1302 is of a relatively moderate height and includes slots to allow insertion of six memory modules.

Figure 14A:
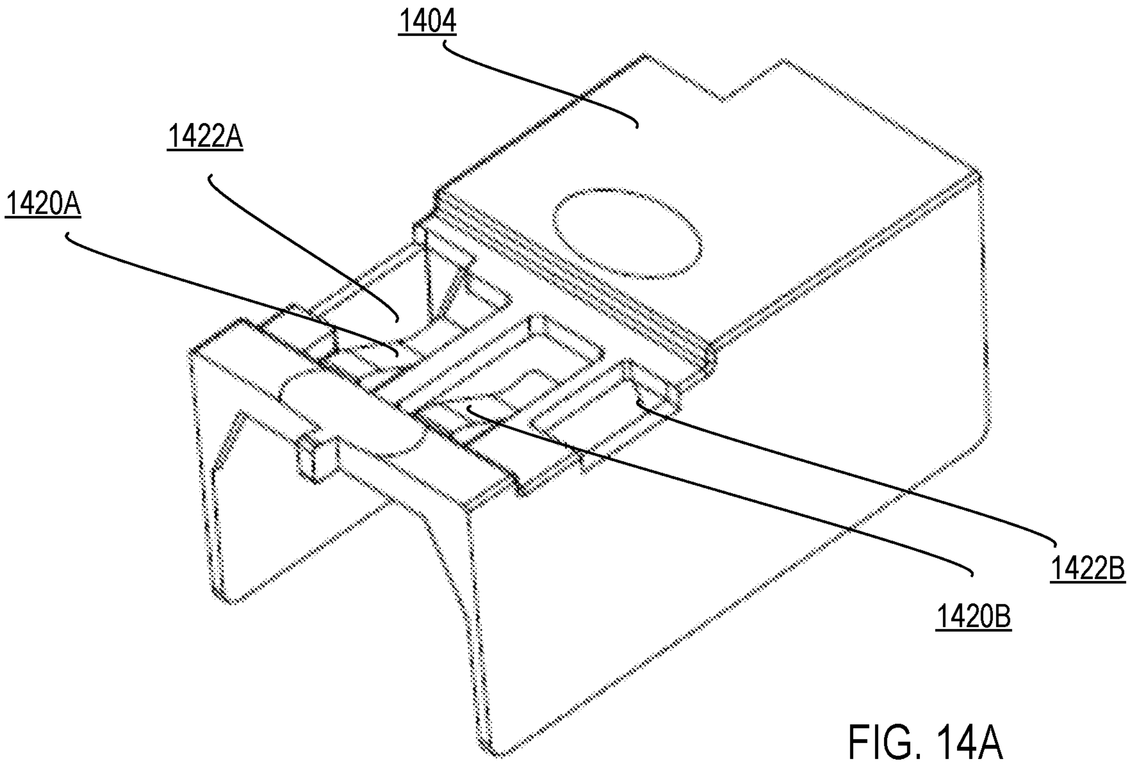
FIGS. 14A-14B show perspective views of a cap portion of a guidance and retention structure for guidance and retention of memory modules according to other embodiments of the present disclosure.
Figure 14B:
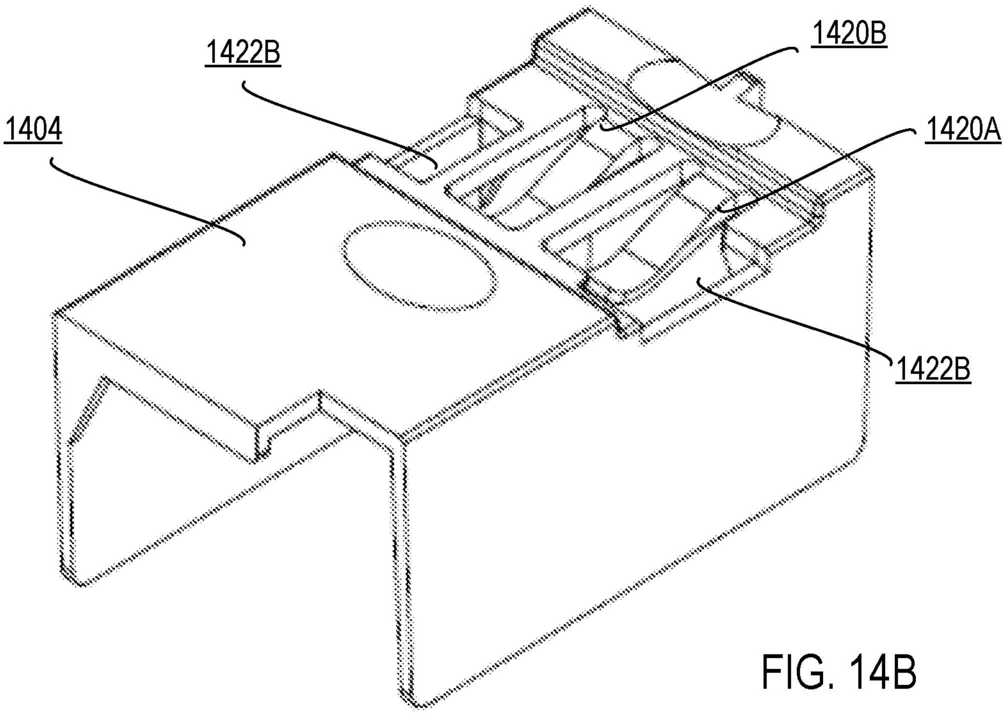

FIGS. 14A-14B show perspective views of a cap portion 1404 of a guidance and retention structure for guidance and retention of memory modules according to other embodiments of the present disclosure. FIG. 14A shows a front perspective view of the cap portion 1404, and FIG. 14B shows a rear perspective view of the cap portion 1404. The cap portion 1404 includes a first spring finger 1420A and a second spring finger 1420B. The cap portion 1404 further includes a first engagement slot 1422A and a second engagement slot 1422B.

Figure 15A:
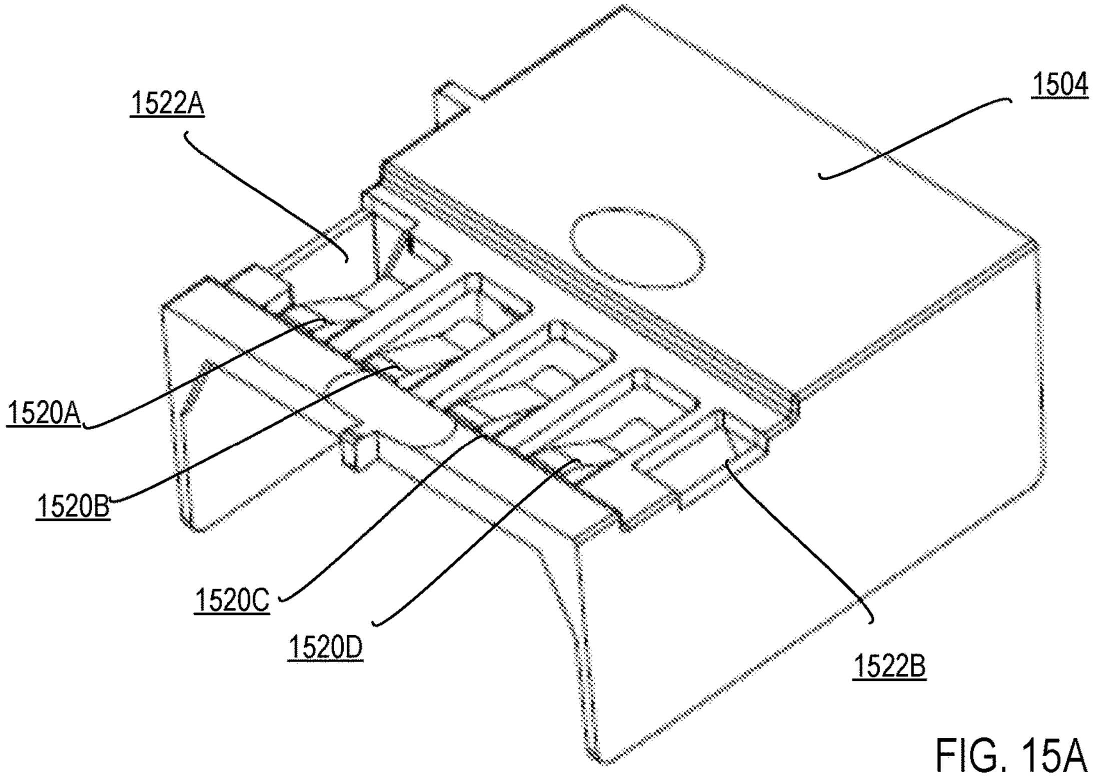
FIGS. 15A-15B show perspective views of a cap portion of a guidance and retention structure for guidance and retention of memory modules according to other embodiments of the present disclosure.
Figure 15B:
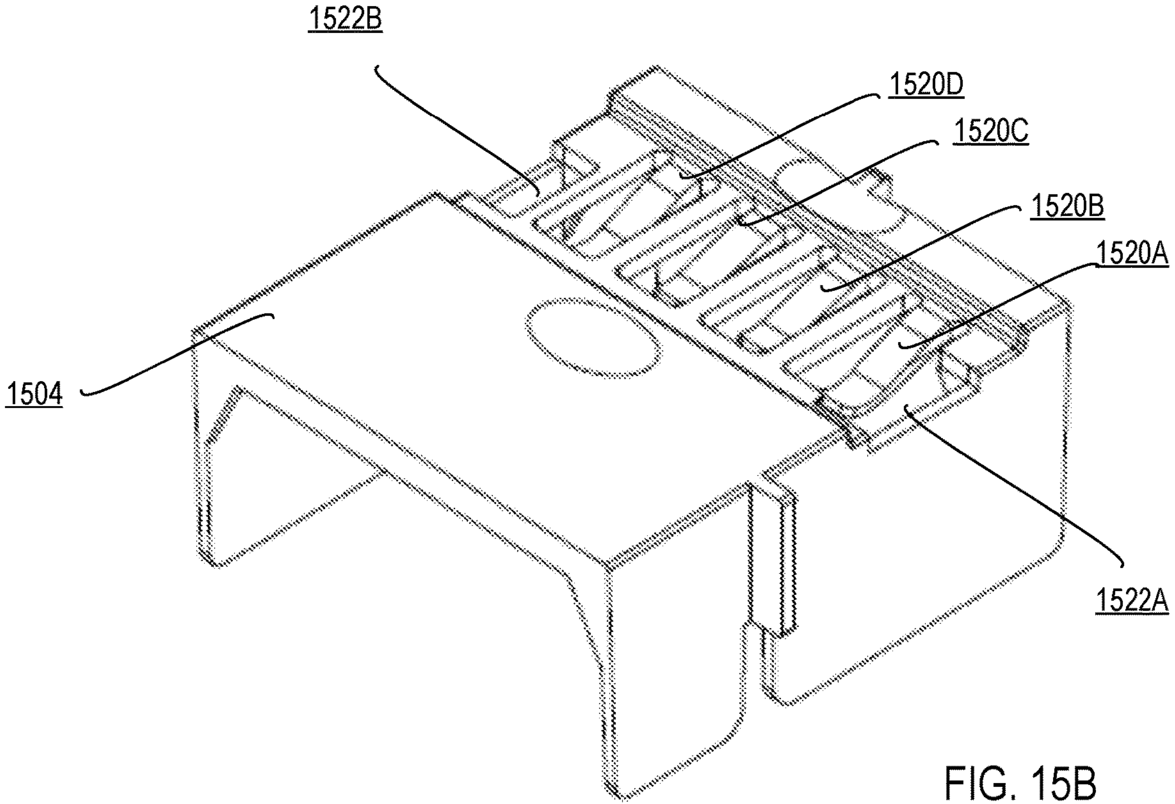

FIGS. 15A-15B show perspective views of a cap portion 1504 of a guidance and retention structure for guidance and retention of memory modules according to other embodiments of the present disclosure. FIG. 15A shows a front perspective view of the cap portion 1504, and FIG. 15B shows a rear perspective view of the cap portion 1504. The cap portion 1504 includes a first spring finger 1520A, a second spring finger 1520B, a third spring finger 1520C, and a fourth spring finger 1520D. The cap portion 1504 further includes a first engagement slot 1522A and a second engagement slot 1522B.

Figure 16A:
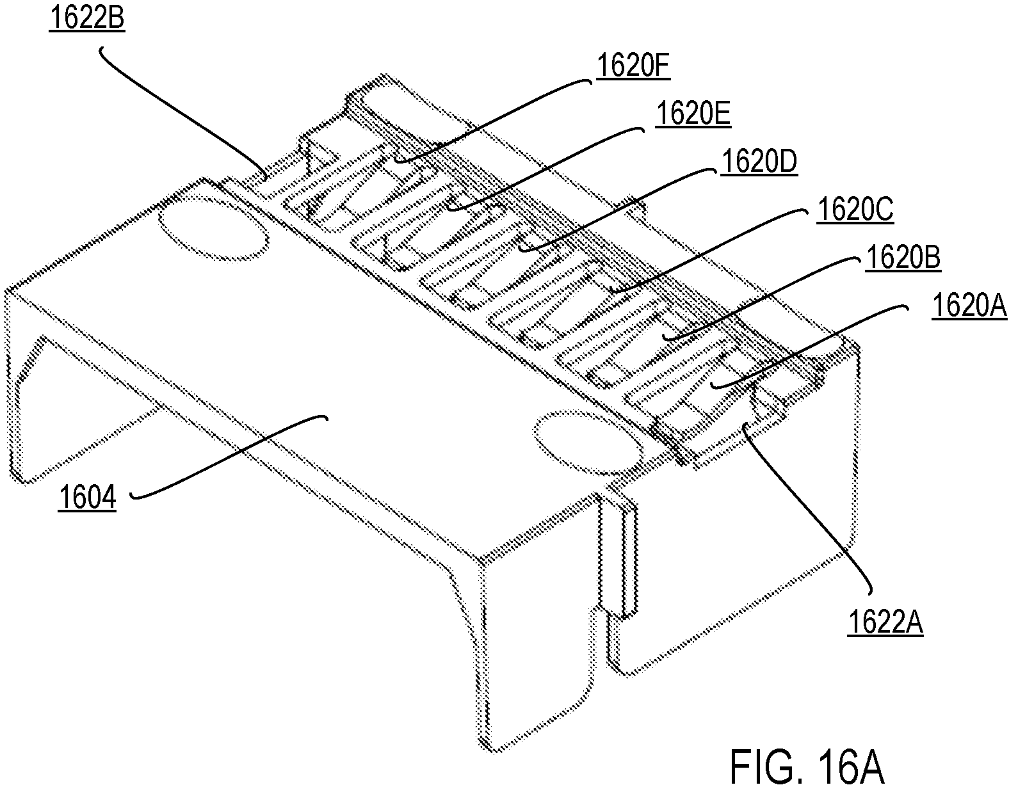
FIGS. 16A-16B show perspective views of a cap portion of a guidance and retention structure for guidance and retention of memory modules according to other embodiments of the present disclosure.
Figure 16B:
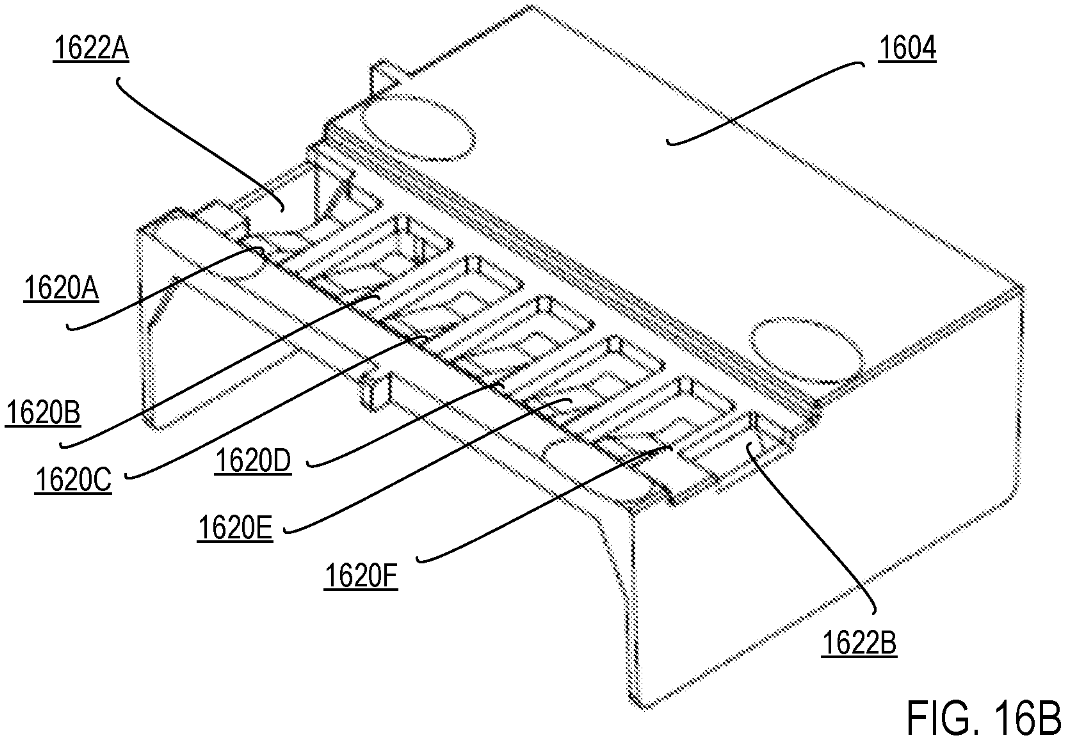

FIGS. 16A-16B show perspective views of a cap portion 1604 of a guidance and retention structure for guidance and retention of memory modules according to other embodiments of the present disclosure. FIG. 15A shows a rear perspective view of the cap portion 1604, and FIG. 15B shows a front perspective view of the cap portion 1604. The cap portion 1604 includes a first spring finger 1620A, a second spring finger 1620B, a third spring finger 1620C, a fourth spring finger 1620D, a fifth spring finger 1620E, and a sixth spring finger 1620F. The cap portion 1604 further includes a first engagement slot 1622A and a second engagement slot 1622B.

Figure 17:
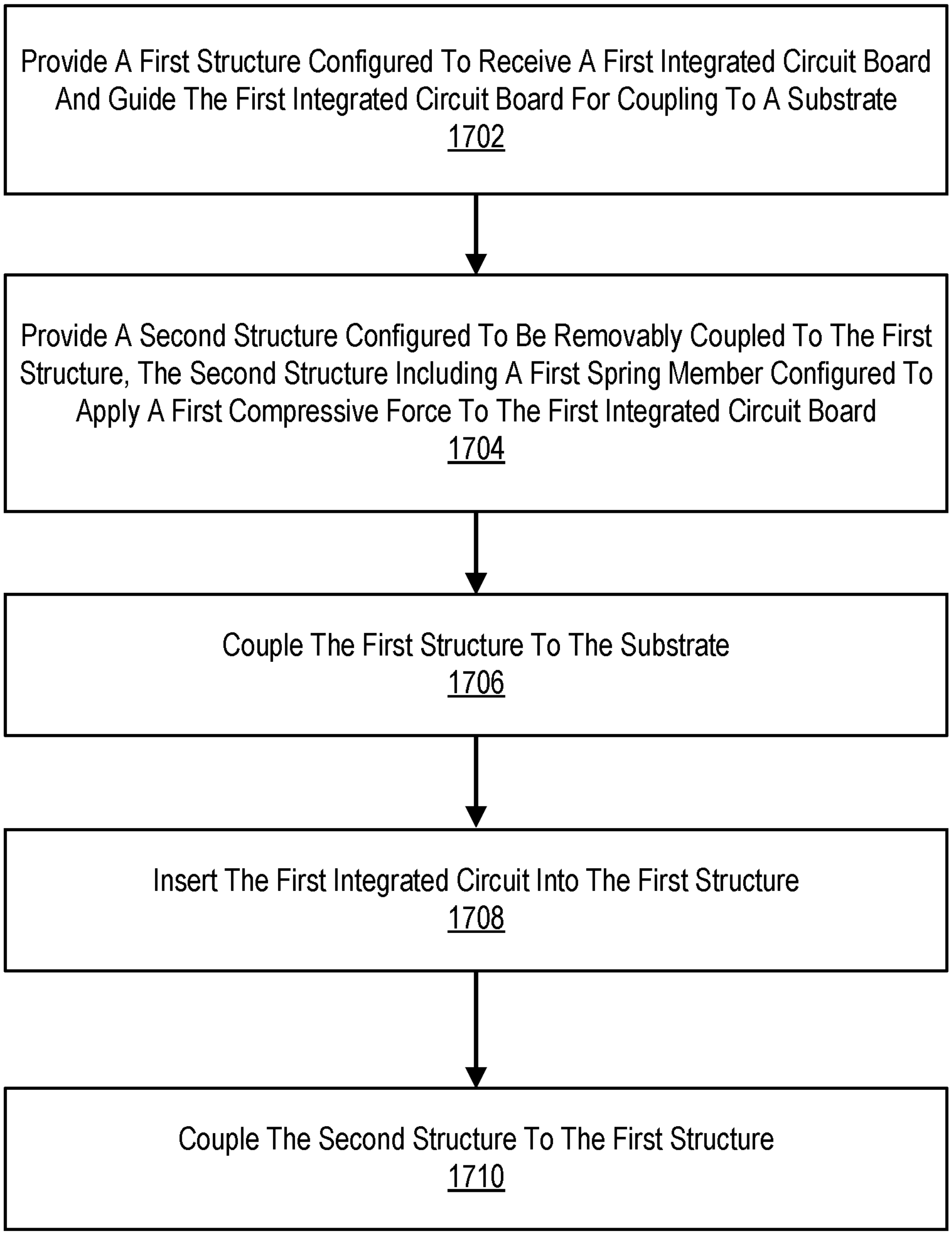
FIG. 17 sets forth a flowchart illustrating an example method for guidance and retention of integrated circuit boards according to embodiments of the present disclosure.

For further explanation, FIG. 17 sets forth a flowchart illustrating an example method for guidance and retention of integrated circuit boards according to embodiments of the present disclosure. The method of FIG. 17 includes providing 1702 a first structure configured to receive a first integrated circuit board and guide the first integrated circuit board for coupling to a substrate. The method of FIG. 17 further includes providing 1704 a second structure configured to be removably coupled to the first structure, the second structure including a first spring member configured to apply a first compressive force to the first integrated circuit board. The method further includes coupling 1706 the first structure to the substrate, inserting 1708 the first integrated circuit board into the first structure, and coupling 1710 the second structure to the first structure.

Various embodiments further provide for a structure for guidance and retention of memory modules allowing for air flow to provide cooling of memory modules while providing for structural robustness against shock and vibration. Various embodiments provide for guidance, retention, and compliance of installed memory modules as well as easy user access. Various embodiments of the structure for guidance and retention of memory modules provide for retaining visibility of LED light pipes and labels for DDIMM identification.

In view of the explanations set forth above, readers will recognize that the benefits of structures for guidance and retention of memory modules within a computing system include:

- Provide for a low-cost, tool-less structure for guidance and retention of various height memory modules having a limited board footprint and limited board holes for mounting to minimally disrupt wiring.
- Provide for a structure for guidance and retention of various height memory modules allowing for air flow to provide cooling of memory modules while providing for structural robustness against shock and vibration.
- Provide for guidance, retention, and compliance of various height installed memory modules as well as easy user access.
- Provide a structure for guidance and retention of memory modules that retains visibility of LED light pipes and labels for DDIMM identification.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. An apparatus for guidance and retention of integrated circuit boards comprising:

a first structure configured to receive a first integrated circuit board and guide the first integrated circuit board for coupling to a substrate; and a second structure configured to be removably coupled to the first structure, the second structure including a first cantilevered spring member configured to apply a first compressive force to the first integrated circuit board.

2. The apparatus of claim 1, wherein the second structure is further configured to receive a second integrated circuit board, and wherein the second structure further includes a second cantilevered spring member configured to apply a second compressive force to the second integrated circuit board.

3. The apparatus of claim 2, wherein the first compressive force is the same as the second compressive force.

4. The apparatus of claim 1, wherein the first structure further includes at least one slot for guiding the first integrated circuit board for coupling to the substrate.

5. The apparatus of claim 1, wherein the first structure is further configured to be coupled to the substrate.

6. The apparatus of claim 1, wherein the first structure includes a guide portion configured to house the first integrated circuit board.

7. The apparatus of claim 6, wherein the second structure includes a cap portion configured to cover a portion of the guide portion, and wherein the second structure is configured to be fully decoupled from the first structure.

8. The apparatus of claim 1, wherein the first structure includes an engagement portion configured to engage the second structure.

9. The apparatus of claim 8, wherein the engagement portion comprises at least one engagement tab configured to engage an engagement slot of the second structure.

10. A method for guidance and retention of integrated circuit boards comprising:

providing a first structure configured to receive a first integrated circuit board and guide the first integrated circuit board for coupling to a substrate; and providing a second structure configured to be removably coupled to the first structure, the second structure including a first cantilevered spring member configured to apply a first compressive force to the first integrated circuit board.

11. The method of claim 10, further comprising:

coupling the first structure to the substrate.

12. The method of claim 11, further comprising:

inserting the first integrated circuit board into the first structure; and coupling the second structure to the first structure, wherein the second structure is configured to be fully decoupled from the first structure.

13. The method of claim 10, wherein the second structure is further configured to receive a second integrated circuit board, and wherein the second structure further includes a second cantilevered spring member configured to apply a second compressive force to the second integrated circuit board.

14. The method of claim 13, wherein the first compressive force is the same as the second compressive force.

15. The method of claim 10, wherein the first structure further includes at least one slot for guiding the first integrated circuit board for coupling to the substrate.

16. The method of claim 10, wherein the first structure is further configured to be coupled to the substrate.

17. The method of claim 10, wherein the first structure includes a guide portion configured to house the first integrated circuit board.

18. The method of claim 17, wherein the second structure includes a cap portion configured to cover a portion of the guide portion.

19. The method of claim 10, wherein the first structure includes an engagement portion configured to engage the second structure.

20. The method of claim 19, wherein the engagement portion comprises at least one engagement tab configured to engage an engagement slot of the second structure.

* * * * *